(12) United States Patent
Leuzinger et al.

(10) Patent No.: US 9,743,800 B2
(45) Date of Patent: Aug. 29, 2017

(54) SYSTEM FOR PREPARING A BEVERAGE FROM INGREDIENTS SUPPORTED BY AN ENCODED INSERT

(71) Applicant: Nestec S.A., Vevey (CH)

(72) Inventors: Roman Leuzinger, Winterthur (CH); Ralph Kugler, Herisau (CH); Enzo Bonacci, Savigny (CH); Jean-Luc Denisart, Cully (CH); Christian Talon, Vufflens-le-chateau (CH); HansPeter Pleisch, Corseaux (CH)

(73) Assignee: Nestec S.A., Vevey (CH)

( * ) Notice: Subject to any disclaimer, the term of this patent is extended or adjusted under 35 U.S.C. 154(b) by 332 days.

(21) Appl. No.: 14/464,490

(22) Filed: Aug. 20, 2014

(65) Prior Publication Data

US 2014/0352547 A1 Dec. 4, 2014

Related U.S. Application Data

(63) Continuation of application No. 12/747,621, filed as application No. PCT/EP2008/067510 on Dec. 15, 2008, now Pat. No. 8,978,544.

(30) Foreign Application Priority Data

Dec. 18, 2007 (EP) .................................... 07123472

(51) Int. Cl.
*A47J 31/00* (2006.01)
*A47J 31/36* (2006.01)
(Continued)

(52) U.S. Cl.
CPC ....... *A47J 31/3676* (2013.01); *A47J 31/0668* (2013.01); *A47J 31/3685* (2013.01);
(Continued)

(58) Field of Classification Search
CPC .... A47J 31/3676; A47J 31/368; A47J 31/369; A47J 31/4492
(Continued)

(56) References Cited

U.S. PATENT DOCUMENTS 4,787,299 A * 11/1988 Levi .................... A47J 31/0657
99/285
5,870,943 A * 2/1999 Levi .................... A47J 31/0647
99/287

(Continued)

FOREIGN PATENT DOCUMENTS

| CN | 1633252 | 6/2005 |
|---|---|---|
| EP | 1310199 | 5/2003 |

(Continued)

OTHER PUBLICATIONS

International Search Report for PCT/EP2008/067510 date of mailing Jan. 26, 2010, 4 pages.

*Primary Examiner* — Reginald L Alexander
(74) *Attorney, Agent, or Firm* — K&L Gates LLP (57) ABSTRACT

The invention proposes a device for preparing a beverage from a food substance contained in a capsule (24) by injection of a liquid into the capsule (24), wherein said liquid is provided by a pump (70) of the device, said device comprising an extraction head (20) having an aperture (22) for inserting a capsule-holder (30) providing the capsule (24) to a capsule-holder receiving chamber (25) of the device, a closing mechanism (21) to selectively enclose said capsule (24) in the capsule-holder receiving chamber (25), at least one injection member (11) to supply a liquid received from the pump (70) to the inside of the capsule (24), a control unit (80) for controlling at least the pump (70) of the device, and decoding means (1) connected to the control unit (80) and designed to read information from the capsule-holder (30).

7 Claims, 5 Drawing Sheets

(51) Int. Cl.
*A47J 31/44* (2006.01)
*A47J 31/40* (2006.01)
*A47J 31/06* (2006.01)

(52) U.S. Cl.
CPC ......... *A47J 31/407* (2013.01); *A47J 31/4492* (2013.01); *A47J 31/368* (2013.01); *A47J 31/369* (2013.01)

(58) Field of Classification Search
USPC ........... 99/295, 280, 285, 302 R, 323, 289 R
See application file for complete search history.

(56) References Cited

U.S. PATENT DOCUMENTS

| | | | |
|---|---|---|---|
| 6,046,349 | A | 4/2000 | Batz-Sohn |
| 7,469,628 | B2 | 12/2008 | Mandralis |
| 7,673,558 | B2 | 3/2010 | Panesar |
| 7,806,043 | B2 | 10/2010 | Zanetti |
| 8,443,718 | B2 | 5/2013 | Denisart |
| 2003/0129286 | A1 | 7/2003 | Knepler |
| 2004/0237793 | A1 | 12/2004 | Zurcher et al. |
| 2007/0015782 | A1 | 1/2007 | Miyazawa |
| 2007/0157821 | A1 | 7/2007 | Panesar et al. |
| 2008/0148957 | A1 | 6/2008 | Zanetti |
| 2010/0083843 | A1 | 4/2010 | Denisart |
| 2010/0107889 | A1 | 5/2010 | Denisart |
| 2010/0275787 | A1 | 11/2010 | Bonacci et al. |

FOREIGN PATENT DOCUMENTS

| | | |
|---|---|---|
| EP | 1440638 | 7/2004 |
| EP | 1731063 | 12/2006 |
| EP | 1967099 | 9/2008 |
| EP | 1967100 | 9/2008 |
| JP | 2000-515031 | 11/2000 |
| JP | 2001061665 | 3/2001 |
| JP | 2004-215764 | 8/2004 |
| JP | 2004215764 | 8/2004 |
| JP | 2007522856 | 8/2007 |
| KR | 1019990025713 | 9/1999 |
| KR | 2000011376 | 2/2000 |
| KR | 20060129474 | 12/2006 |
| KR | 20070073789 | 7/2007 |
| KR | 20070110020 | 11/2007 |
| WO | 02074144 | 9/2002 |
| WO | 03059778 | 7/2003 |
| WO | WO2004064585 | 8/2004 |
| WO | 2005079638 | 9/2005 |
| WO | 2007/072413 | 6/2007 |
| WO | WO2007072413 | 6/2007 |

\* cited by examiner

SYSTEM FOR PREPARING A BEVERAGE FROM INGREDIENTS SUPPORTED BY AN ENCODED INSERT

PRIORITY CLAIM

This application is a continuation of U.S. application Ser. No. 12/747,621, filed Jun. 11, 2010, which is a U.S. national stage filing of International Appl. No. PCT/EP2008/067510, filed Dec. 15, 2008, which claims priority to European Patent Appl. No. 07123472.8, filed Dec. 18, 2007, the entire contents of which are expressly incorporated herein by reference thereto.

BACKGROUND OF THE INVENTION

The present invention relates to a system for preparing a beverage from a food ingredient provided to a beverage preparation device while being supported by an insert. One example are ingredients contained within a capsule, the capsule being inserted into a beverage production device while being supported by a capsule-holder removable from the beverage production device. More particularly, the invention relates to a system for preparing a beverage from capsules with an encoded insert, such as a capsule-holder, and a device comprising decoding means for interacting with the encoding means of the insert. The invention relates also to a device comprising decoding means adapted to receive an encoded insert. The invention also relates to the encoded insert adapted to fit into the device. In addition, the invention proposes a capsule-holder comprising a deflector for deflecting liquid provided to the capsule-holder for cleaning or rinsing purpose of the device.

Devices for preparing a beverage by injecting pressurized fluid into a capsule are well-known, especially in the field of preparing coffee or coffee type beverages. In addition, other substances such as chocolate or milk products can be extracted or dissolved to form a beverage. The advantages of such a system are in particular the conservation and freshness of the ingredients, as well as the possibility of facilitating the operation of preparing the beverage.

The method of preparing the beverages using such a device is in principle as follows. The sealed capsule is usually first inserted into a capsule-holder receiving chamber of the beverage preparation device. After that, a water injecting means such as a needle connected to the liquid supply of the device and which projects inside the capsule-holder receiving chamber, is introduced through a face or inlet port of the capsule to inject a hot or cold (ambient or chilled) liquid, in order to make the liquid interact with the ingredients within the capsule. The liquid beverage resulting from this interaction is then discharged through another face of the capsule. For instance, the lower face of the capsule opens due to the internal pressure in the capsule generated by injecting the liquid allowing the beverage to exit the capsule.

It should be understood that the interaction between the liquid and the ingredients within the capsule can be e.g. dissolving, extraction, brewing or the like in order to prepare of beverage by means of ingredients provided within the capsule.

Devices which adapt the above described principle of beverage preparation may be furnished with a capsule-holder in order to provide the capsule to the device. For instance, EP 1731063 A1 describes a capsule-holder intended to be connected to a beverage preparation system comprising an injection member which extends inside a housing of the capsule-holder which houses a capsule to be provided to the beverage preparation system. Thus, the capsule does not have to be provided to the capsule-holder receiving chamber of the device manually which is more convenient for the user of the device. Moreover, capsule-holders with different features can be connected to the device e.g. in order to house a series of different types of capsules with different ingredients, such as tea, ground coffee, milk or the like. In addition, capsules of different volumes may be provided to the device.

The co-pending European patent applications EP 07103610.7 and EP 07103613.1 describe a solution with a removable capsule-holder and in which the water injection system is no longer part of the capsule-holder but is part of the beverage production machine which receives the capsule-holder.

It is known that the quality of the beverage to be prepared by such a device is to a great extent influenced by the injection conditions such as the flow rate, the pressure and/or the temperature of the liquid injected into the capsule. Depending on the substance within the capsule to be made to interact with the liquid provided by the device, different injection conditions may lead to best results regarding the quality and taste of the beverage. In particular, an automatic adaptation of the correct injection conditions with regard to the type of capsule provided to the device would be desirable as for reasons of convenience and simplicity.

EP 1440638 A1 discloses a beverage preparation device which comprises means for reading a barcode of a capsule provided to the device. Hence, the injection parameters may be changed by the device in order to provide a best setup with regard to the type of the capsule provided to the device. However, the usage of a barcode has the disadvantage that the barcode may be damaged or covered with residua or the like and therefore cannot be read correctly.

In a device which uses a capsule-holder to provide a capsule to the device, it would therefore be of particular interest to enable a safe transfer of information between the capsule-holder and the device, in order to transmit information regarding the capsule or the capsule-holder to the device. Accordingly, best results in the beverage preparation process may be obtained.

A disadvantage of the known devices is that even when the capsule-holder is not placed in the support at the liquid supply of the device, the device can still be operated since there is no way of determining whether the capsule-holder is in the correct position or not. Thus, it would be particularly desirable to find a way of transmitting information regarding the correct positioning of the capsule-holder within the drink preparation device.

Furthermore, in conventional devices having a capsule-holder intended to be connected to the device, the problem of finding the correct locking position of the capsule-holder arises. Hence, a user may intend to use a closing mechanism of the device in order to enclose the capsule-holder and thus the capsule within the capsule-holder receiving chamber of the device, but cannot proceed when the capsule-holder is not fully inserted into the device. Therefore, especially a mechanism is sought-after which enables a user to easily determine whether the capsule-holder is in its correct position or not.

Moreover, the inside of the capsule-holder receiving chamber and particularly an injection member of the known devices are likely to be subjected to residua of dissolved or solid substance within the capsule to be pierced. Thus, cleaning of the injection member should be regularly carried out in order to prevent the injection member from being blocked and accordingly ensure a correct functioning of the injection member. Furthermore, cleaning of the capsule-holder receiving chamber and the housing of the capsule provided at the capsule-holder is very important to ensure a hygienic environment within the device. Hence, a design of a capsule-holder for being connected to the device is sought-after which facilitates the maintenance and cleaning of the capsule-holder receiving chamber and the injection member, as well as the capsule-holder itself.

In addition, the beverage preparation device may be used for other purposes than brewing ingredients contained in the capsule of the capsule-holder. For instance, the beverage preparation device should be able to be operated for delivering hot or cold water in safe conditions, e.g., at a reduced water pressure and toward a controlled direction, for example to fill a receptacle to prepare beverages such as tea from tea bags. Hence, delivery of water in absence of a capsule-holder should be controlled so that it does not create hazardous water jets of hot liquid that could burn the user.

The present invention seeks to address the above described problems. The invention also aims at other objects and particularly the solution of other problems as will appear in the rest of the present description.

SUMMARY

In a first aspect, the invention proposes a device for preparing a beverage from an ingredient contained in a capsule by injection of a liquid into the capsule, wherein said liquid is provided by a pump of the device, said device comprising an extraction head having an aperture for inserting a capsule-holder providing the capsule to a capsule-holder receiving chamber of the device, a closing mechanism to selectively enclose said capsule in the capsule-holder receiving chamber, at least one injection member which is arranged so as to project into the capsule-holder receiving chamber of the extraction head to supply a liquid received from the pump to the inside of the capsule, a control unit for controlling at least the pump of the device, and decoding means connected to the control unit and designed to read information from the capsule-holder.

With a device according to the present invention, it is possible to enable an interaction between liquid supplied by the device, more particularly by the pump of the device, and ingredients contained in a capsule provided to the device by means of a capsule-holder. The internal pressure within the sealed capsule which is built up due to the liquid supply to the capsule causes a lower face of the capsule to open which enables the output of the beverage to be prepared. Thereby, the injection of the liquid provided by the device takes place at an upper face of the capsule which is pierced by the injection member of the device. As already described, the output of the beverage to be prepared takes place at the lower face of the capsule thus, enabling a direct flow of the liquid. Accordingly, a receptacle such as a cup can be placed beneath the capsule in order to receive the beverage to be prepared.

WO 03059778 relates to such a capsule which is preferably used for beverage preparation with the present device. The capsule contains one or more ingredients. After the injection of liquid into the capsule, the pouring from the capsule may be delayed in order to provide sufficient time for the interaction of the liquid and the ingredients contained within the capsule. For the pouring of the beverage to be prepared from the capsule, opening means may be provided, such as e.g. relief members thrust against an outlet membrane which open a lower wall of the capsule. These opening means are activated by the pressure rise within the capsule when the liquid is injected. The capsule has amongst others the advantage that beverages can be prepared without "cross-contamination" i.e. that a first beverage to be prepared does not transmit one or more undesired characteristics such as taste, color and/or odor to a second beverage distributed after the first. The present invention may as well apply to any other food or beverage cartridge, pod or sachet containing ingredient(s) brewed, dissolved or diluted in a beverage device according to any other principle than WO 03059778.

In the context of the invention, the term "capsule" is used to encompass any cartridge, pod or sachet using these other brewing principles.

According to an aspect of the invention, the closing mechanism of the device has an open and a closed state. The capsule-holder can only be inserted to or withdrawn from the aperture provided at the extraction head of the device when the closing mechanism is in an open state. As the closing mechanism is connected to the injection member, it causes a relative movement of the injection member and the capsule provided by the capsule-holder to the capsule-holder receiving chamber of the device. Accordingly, by usage of the closing mechanism, the capsule provided to the capsule-holder receiving chamber of the device can effectively be connected, such as by piercing, to the injection member of the device.

The control unit of the device may be used in order to control at least the pump and the heater of the device in order to adjust the operational parameters during the preparation of the beverage.

As the device is provided with decoding means, it is possible to transmit information such as a code or signal for example from a capsule-holder inserted into the aperture of the extraction head to the device. Hence, the decoding means of the device may for example read a code or detect a signal transmitted by the capsule-holder in order to detect the presence of the capsule-holder within the aperture of the extraction head. In a preferred embodiment, the decoding means are situated within the aperture the capsule-holder is inserted to thus, enabling an interference-free transmission of information from the capsule-holder to the decoding means. Of course, the decoding means may as well be located at another position within the extraction head of the device.

As the decoding means are connected to the control unit of the device, it is possible to adjust the operation of the control unit due to the information read by the decoding means. Accordingly, it is possible to enable an operation of the pump for example depending on the information read by the decoding means. Moreover, it is possible to adjust the operational parameters of the pump and the heater for example in order to influence the beverage preparation with respect to the temperature and the pressure of the liquid to be supplied to the capsule. Of course, other parameters can be adjusted by the control unit due to the information read by the decoding means as well.

This has the advantage that the device can set operational parameters of the beverage preparation in response to detection of a certain capsule-holder. Thus, it is not the capsule which identifies itself, but the identification can be made through the correspondingly adapted capsule-holder, such that e.g. a capsule-holder for coffee capsules can be distinguished from a capsule-holder e.g. for tea. Accordingly, the extraction time, the extraction pressure and/or the extraction temperature, etc. can be set depending on the identified capsule-holder.

Moreover, the operation of the device or more particularly of the pump of the device may be disabled when the encoding means do not identify or detect the presence of the capsule-holder within the aperture of the extraction head. In a mode, detection of the presence of the capsule-holder is carried out by creation and detection of a sufficient magnetic field between the capsule-holder and the extraction head. Thus, a user is prevented from unintentional usage of the device when no capsule-holder is inserted into the aperture of the extraction head.

It should be understood that the information exchange and/or the detection of presence of the capsule-holder by the decoding means of the device can be a contactless interaction such as a magnetic field or an optical system such as light or laser emitting/transmitting device. Accordingly, the capsule-holder can be inserted to and withdrawn from the aperture of the extraction head without any difficulties. Moreover, a convenient and safe way of interaction between the capsule-holder and the decoding means is achieved. The interaction between the capsule-holder and the device present the advantage that the device is less prone to be affected by residua or other substances as if the interaction is carried out between the capsule itself and the device. Preferably, the capsule-holder and the decoding means of the device interact optically or magnetically. Of course, the capsule-holder and the decoding means may as well interact in another way such as by a mechanical detection means, for instance by specific geometrical forms provided on the capsule-holder.

In a preferred embodiment the decoding means comprise a Reed sensor designed to detect a magnetic field. Hence, the decoding means can easily determine the presence of a capsule-holder when said capsule-holder is made of magnetic material or has magnets attached to it.

It should be understood that the transmitted code provided to the decoding means of the device by the capsule-holder can be a non-programmable or programmable code. Hence, the transmitted information respectively the transmitted code is not restricted to one type. Accordingly, various different interactions between the decoding means and the capsule-holder are possible. Hence, the decoding means may be used to read a plurality of information of the capsule-holder.

In a preferred embodiment, a ferromagnetic material is provided within the aperture of the extraction head in order to attract a capsule-holder inserted into the aperture, whereby the capsule-holder is provided with at least one magnet or is made of magnetic material. This embodiment is especially advantageous because the capsule-holder is drawn and positioned into its correct position within the aperture due to the attraction of the magnets and ferromagnetic material. Due to the attractive magnetic forces created, the capsule-holder becomes magnetically locked in the correct position. Hence a feedback signal for the user of the devices is provided that informs the user that the capsule-holder has reached its correct position within the aperture. A user may therefore be prevented from operating the closing mechanism to enclose the capsule when the capsule-holder is not fully inserted into the aperture of the extraction head. Accordingly, the handling of the device for the user is more convenient and easier and it does not require specific knowledge for operating the device.

The above described embodiment of the device enables the operation of the pump and/or the heater due to the information read by the decoding means of the device. Therefore, the supply of liquid to the extraction head and hence to the injection member when the correct code and/or the presence of a capsule-holder is not detected.

In another aspect, the invention relates to a system for preparing a beverage from a food substance contained in a single-use capsule by injection of a liquid into the capsule, comprising a device and, a capsule-holder comprising a receiving means for a capsule, wherein said liquid is provided by a pump of the device, said device comprising an extraction head having an aperture for inserting a capsule to the capsule-holder receiving chamber of the device, a closing mechanism to selectively enclose said capsule in the capsule-holder receiving chamber, at least one injection member which is arranged to supply a liquid received from the pump to the inside of the capsule, a control unit for controlling at least the pump of the device, and decoding means connected to the control unit and designed to read information from the capsule-holder, wherein the control unit enables a liquid supply to the capsule-holder receiving chamber when no capsule-holder is provided to the device, wherein the system further comprises an insert comprising guiding means for engaging in the capsule-holder receiving chamber and encoding means for interacting with the decoding means provided at the device.

In one possible mode, the insert is a capsule-holder or an ingredient-holder for receiving loose ingredients such as loose ground coffee. Indeed, the system of the invention can also be designed to receive an encoded insert which is a mere receptacle adapted to receive loose ingredients instead of a holder for receiving a capsule. In that case, the receptacle may comprise a specific code that informs the beverage preparation device of the specificity of the insert and/or loose ingredient contained therein so that the device can automatically adjust the parameters (pressure, temperature, flow rate, water volume, etc.) for optimally brewing the loose ingredients. It should be noted that the insert has preferably matching surfaces with an aperture provided at the device which is designed to receive the insert. Moreover, when the insert is connected to the device, it is preferably accessible from outside the device, e.g. a handhold or the like is provided which enhances the manageability of the insert.

However, in a possible mode, the control unit can enable a liquid supply to the capsule-holder receiving chamber when no capsule-holder is provided to the device but another insert that is specifically designed to fit in the device.

For example, the insert can be an element adapted for altering the conditions of the supply of liquid from the injection member. For example, the insert may comprise means for reducing the pressure of the supplied liquid and/or modifying the direction of the jet(s) of the supplied liquid. These pressure reduction means or means for modifying the direction of the supplied jet(s) can be a specifically designed water injection interface that connects to the injection member. For example, the insert may be designed as a shower that splits a single water jet of the injection member of the device into a plurality of jets of reduced pressure.

In another aspect, the invention relates to a capsule-holder designed for insertion into a device for preparing a beverage from ingredients contained in a capsule by injection of a liquid within the capsule, comprising a means for receiving a capsule, a handhold for handling the capsule-holder, and encoding means for interaction with the coding means provided at the device the capsule-holder is designed to be inserted to.

With this apparatus, a user can easily provide a capsule housed by the means for receiving the capsule of the capsule-holder to a device for beverage preparation. The handhold of the capsule-holder thereby enables a facilitated handling of the capsule-holder. As encoding means are provided to the capsule-holder, the capsule-holder may interact with and hence provide information to the device the capsule-holder is designed to be connected to. Thereby, the encoding means may interact optically, magnetically, wirelessly or by mechanical contact with the device. The encoding means may as well be a geometrical form of the capsule-holder intended to interact with the decoding means of the device.

In a preferred embodiment, the capsule-holder is furnished with at least one magnet attached to the at least one face of the capsule-holder. Hence, a magnetic interaction between the capsule-holder and a metallic or magnetic part, e.g. a metal sheet, provided inside the capsule-holder receiving chamber of the device is enabled. More preferably, the capsule-holder comprises two magnets symmetrically arranged i.e. on both sides of the front face of the capsule-holder, in order to assure a correct position of the capsule-holder within the aperture of the device. Accordingly, the insertion of such a capsule-holder into an aperture of a beverage preparation device is facilitated, as the capsule-holder is drawn into the aperture.

The capsule-holder may as well comprise means for detecting and decoding information transmitted by an object such as a capsule received by the capsule-holder. Hence, the capsule-holder may act as an interface or provide an interface between the capsule and the beverage preparation device. Thereby, the information encoded via the capsule-holder may be information which is actually triggered, e.g. mechanically from the capsule, in which case the capsule-holder would simply forward information initially encoded (e.g. mechanically) on the capsule. For this purpose, springs, needles, pins or the like may be provided to the capsule-holder in order to decode information supplied by the capsule received. Thus, the capsule-holder may forward information regarding e.g. the size or the volume of the actually inserted capsule via the provided encoding means. The capsule-holder may as well provide information about the ingredients contained within the capsule to the device.

In a preferred embodiment, the capsule-holder is further provided with a deflector which is positioned at the inner side of the means for receiving the capsule. Hence, when the capsule-holder is inserted into the aperture of the device, a water jet provided by the device or more particularly by the pump of the device can be used to wash the inner surface of the means for receiving the capsule. Preferably, the deflector is designed to reflect a liquid jet that impacts on its surface in a spray of fan. Accordingly, the inside of the capsule-holder and a lower surface of the injection member being positioned above the means for receiving the capsule of the capsule-holder when said capsule-holder is inserted into the aperture of the device, can be effectively cleaned.

This is especially advantageous as the cleaning process of the capsule-holder receiving chamber within the aperture of the extraction head of the device is facilitated. Thus, a user does not have to clean the inside of the capsule-holder receiving chamber and particularly the lower surface of the injection member situated above the capsule-holder receiving chamber by insertion of a cleaning cloth. Hence, the risk of the user getting in contact with the injection member and particularly with the needle of the injection member is minimized. Thus, an added quality value of the device especially with regard to the cleaning process of the device is attained.

In another preferred embodiment the capsule-holder may as well be equipped with two outlets in order to separate the beverage prepared by inserting the liquid from the device into the capsule. Accordingly, a user may place two receptacles beneath said capsule-holder in order to prepare two equal types of beverage. It may as well be possible to design a holder having two outlets but no means for receiving a capsule. Accordingly, such a holder may be inserted into the aperture of the device in order to redirect the liquid supplied by the injection member to two cups provided beneath the holder. Such a holder may as well be equipped with means for housing a sieve or a filter in order to hold objects such as tealeaves within said holder and use the liquid provided by the injection member to prepare a beverage such as tea.

Further features, advantages and objects of the present invention will become apparent for the skilled person when reading the following detailed description of embodiments of the present invention, when taking in conjunction with the figures of the enclosed drawings.

DETAILED DESCRIPTION

Figure 1:
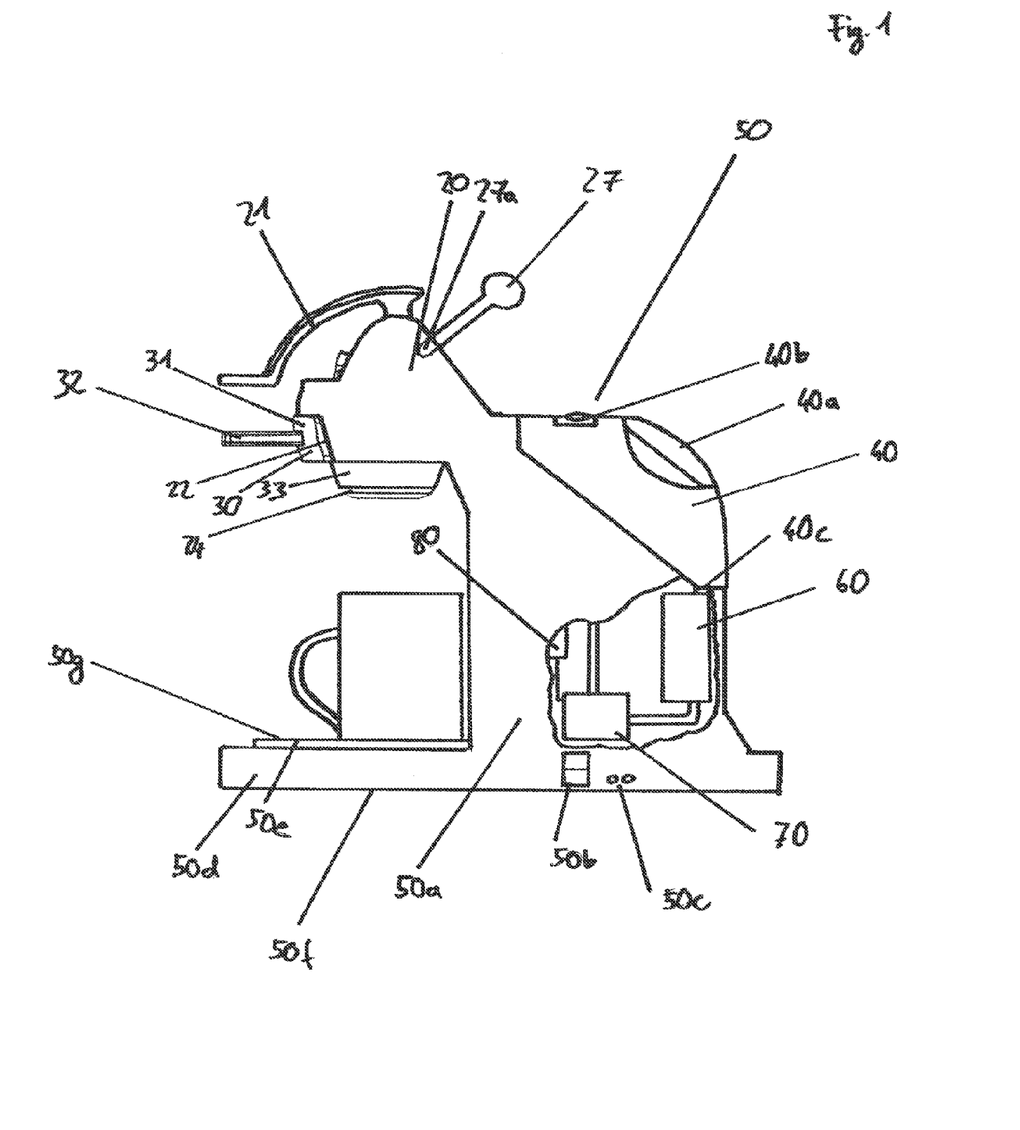
FIG. 1 shows a device for beverage preparation according to the present invention in side view.

FIG. 1 shows a beverage preparation device 50 according to the present invention in side view. The device 50 comprises a housing 50a containing at least a heater 60, a pump 70 and control means 80. Further the device comprises a reservoir 40 connected to the device, an extraction head 20 and a base 50f which is preferably provided with feet for standing the device thereon in a stable manner. The device further comprises a stand 50d for a receptacle such as a cup having an upper surface 50e provided with a grid 50g on which the receptacle is positioned.

The reservoir 40 is provided in order to supply liquid such as water to the heater 60 and the pump 70, and hence to the extraction head 20 and the injection member 10 (not shown in FIG. 1) of the device 50. Preferably, the reservoir 40 is connected to the device in a detachable manner and has an inlet 40b in order to insert liquid. It is preferably provided with a handhold 40a for facilitating the handling of the reservoir 40. Thus a user can handle the reservoir 40 in a convenient way. An outlet 40c which is preferably situated at the bottom of the reservoir 40 enables a connection between the reservoir 40 and the device 50.

The extraction head 20 of the device comprises a closing mechanism 21 for selectively enclosing a capsule 24 provided to the device 50 in a capsule-holder 30 and a control lever 27 for selectively supplying either cold or hot water to the extraction head 20 and hence to the capsule 24. Thereby, the control lever 27 is connected at least to the control means 80 of the device 50. Hence, the control lever 27 may be switched over from a neutral position to a first position choosing hot water or to a second position choosing cold water by moving the control lever 27 to the left or to the right when seen in front-rear direction of the device 50. Accordingly, a user can choose whether to provide cold or hot water to the capsule provided to the device in order to prepare a cold or hot beverage. For enabling the movement of the control lever 27 the housing 50a of the device 50 provides a groove 27a at the extraction head 20 of the device.

As can be seen in FIG. 1, a capsule-holder 30 is inserted into an aperture 22 of the extraction head 20 in order to provide a capsule 24 housed by holding means 33 for receiving the capsule 24 to the capsule-holder receiving chamber 25 (not shown in FIG. 1) of the extraction head 20. The holding means 33 of the capsule-holder 30 can form, for example, a cup with a bottom with an inner shape complementary to the shape of the capsule 24 and comprising a central outlet for allowing the beverage to be released from the bottom of the capsule. A handhold 32 is connected to the capsule-holder 30 in order to enable a convenient handling of the capsule-holder 30. The capsule-holder comprises side guiding means 63 for guiding the insertion of the capsule-holder in the chamber of the device. An lower edge 61 and a upper edge 62 can be provided on each side of the capsule-holder which can be slightly inclined relative to each other in the front direction of the capsule-holder so as to form a "wedged" guiding shape as described in co-pending European patent application No. 07103613.1. Furthermore, the capsule-holder 30 includes a front cover 31, which covers the aperture 22 when the capsule-holder is inserted into said aperture 22.

The device further comprises a main switch 50b and a plurality of control indicators 50c which may inform the user about the operating status of the device 50.

Figure 2:
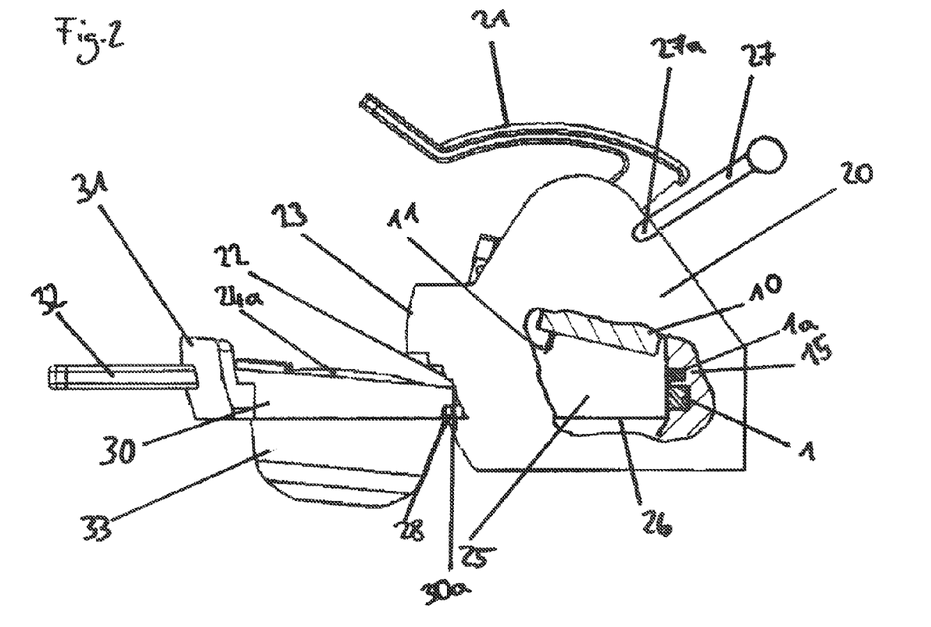
FIG. 2 shows an extraction head of the machine in side view having an aperture for introducing a capsule-holder.

FIG. 2 shows the extraction head 20 of the device 50 when seen from a side view. As can be seen in the figure, the closing mechanism 21 is in an open state. Preferably the closing mechanism may be operated by a lever protruding from the housing 50a of the device 50. More preferably, the lever protrudes from the extraction head 20 of the device 50.

Since the closing mechanism 21 is connected to the injection member 10 of the device, a relative movement between the injection member 10 and a rear wall 15 of the capsule-holder receiving chamber 25 is enabled when operating the closing mechanism 21. Thus, when the closing mechanism 21 is in an open state, the injection member 10 is in a lifted position. Accordingly, the capsule-holder 30 can be inserted to the aperture 22 of the extraction head 20 and a capsule 24 housed by the capsule-holder 30 can be effectively be supplied to the capsule-holder receiving chamber 25 of the device.

In order to enclose the capsule 24 within the capsule-holder receiving chamber 25, the user may operate the closing mechanism 21 and hence bring the closing mechanism 21 in a closed state. Thereby, the injection member 10 is lowered from its lifted position to a lowered position of injection against the capsule 24 so that the capsule 24 within the capsule-holder receiving chamber 25 is effectively enclosed. When enclosing the capsule 24, a protruding needle element 11 provided to the injection member 10 effectively pierces an upper surface 24a of the capsule 24.

In a preferred embodiment, the capsule-holder 30 may not be inserted to or withdrawn from the aperture 22 of the extraction head 20 when the closing mechanism 21 is in a closed position. For instance, a stop means 10a may be provided on the injection head 20 that cooperates with a surface of the capsule-holder 30 to block the capsule-holder 30 in place in the closing position of the closing mechanism 21. Therefore, this ensures that the needle protruding from the injection member 10 is not damaged and reconstitution of the beverage is done in optimal conditions.

The aperture 22 is designed so as to receive the capsule-holder 30. Hence, the user is effectively prevented from inserting the capsule-holder in a wrong way into the aperture 22. Complementary guiding means 26 are provided inside the capsule-holder receiving chamber 25 which engage the "wedged" guiding means 63 of the capsule-holder to ensure a correct position of the capsule-holder 30 inside the capsule-holder receiving chamber 25.

Furthermore, decoding means 1 are provided on the device 50 in order to enable an interaction, e.g., an exchange of information or a signal detection of presence, between the device 50 and the capsule-holder 30. In a preferred embodiment according to FIG. 2, the decoding means 1 are provided at the vicinity of the aperture 22 for inserting the capsule-holder 30. More preferably, the decoding means 1 are provided at the rear wall 15 of the capsule-holder receiving chamber 25. Hence, the decoding means 1 can effectively interact with a capsule-holder 30 inserted into the aperture 22 of the extraction head 20.

Preferably, the decoding means 1 are interacting with the capsule-holder 30 contactless, magnetically or optically. Thus, the operation of the decoding means 1 is not affected by residua of coffee, tea or the like within the capsule-holder receiving chamber 25. A signal transmitted or supplied by the capsule-holder can thus effectively be read by the decoding means 1. Moreover, as the decoding means 1 are recessed into the housing 50a of the device 50, they are not subjected to environmental influences.

In a preferred embodiment the capsule-holder 30 is equipped with at least one magnet 28 connected to the front face 30a of the capsule-holder 30. Hence, a capsule-holder 30 inserted into the aperture 22 is attracted to an iron core or by another magnet 1a which may be provided at the rear wall 15 of the capsule-holder receiving chamber 25. In the position of insertion of the capsule-holder 30 in the receiving chamber 25, a magnetic attraction of the magnet 28 and the iron core or other magnet 1a is established whereby the capsule-holder 30 comes in contact with the rear wall 15 of the chamber 25. Contact may be established directly between magnet 28 and iron core or other magnet 1a or indirectly through a physical engagement of surfaces of the capsule-holder 30 and the receiving chamber 25 as a result of the creation of the magnetic field. Therefore, a correct position of the capsule-holder 30 within the capsule-holder receiving chamber 25 can be assured. For example, the user has to insert the capsule-holder 30 half the way or preferably ⅘ths the way within the receiving chamber 25 before interlocking between the magnet 28 and the iron core or other magnet 1a occurs and the capsule-holder 30 is attracted to rear wall 15 of the receiving chamber 25. More preferably, two magnets 28 are provided symmetrically at the front face 30a of the capsule-holder 30. Due to this embodiment, a correct locking position of the capsule-holder 30 within the aperture 22 can be assured and the closing mechanism 21 can be operated by a user. Of course, the magnets 28 of the capsule-holder 30 could be replaced by ferro-magnetic parts such as iron members that magnetically interact with magnets of the device.

The decoding means 1 provided at the device 50 may be a Reed-sensor designed to detect a magnetic field or any other equivalent electrical or electronical switch operated by an applied magnetic field. The presence of a capsule-holder 30 equipped with magnets 28 can therefore be detected by the decoding means 1. As the decoding means 1 are connected to the control means 80 (not shown) of the device 50, the operation of the device 50 can be controlled by the information supplied by the decoding means 1 to the control means 80. For example, when the presence of the capsule-holder inside the aperture 22 is detected due to the decoding means 1, the control means 80 may enable an operation of the pump 70 (not shown) and the heater 60 (not shown) in order to enable an operation of the device 50. If no magnetic field is detected and hence, no presence of the capsule-holder 30 is assumed, the device 50 remains in a stand-by-mode and the pump 70 cannot be operated.

Figure 3:
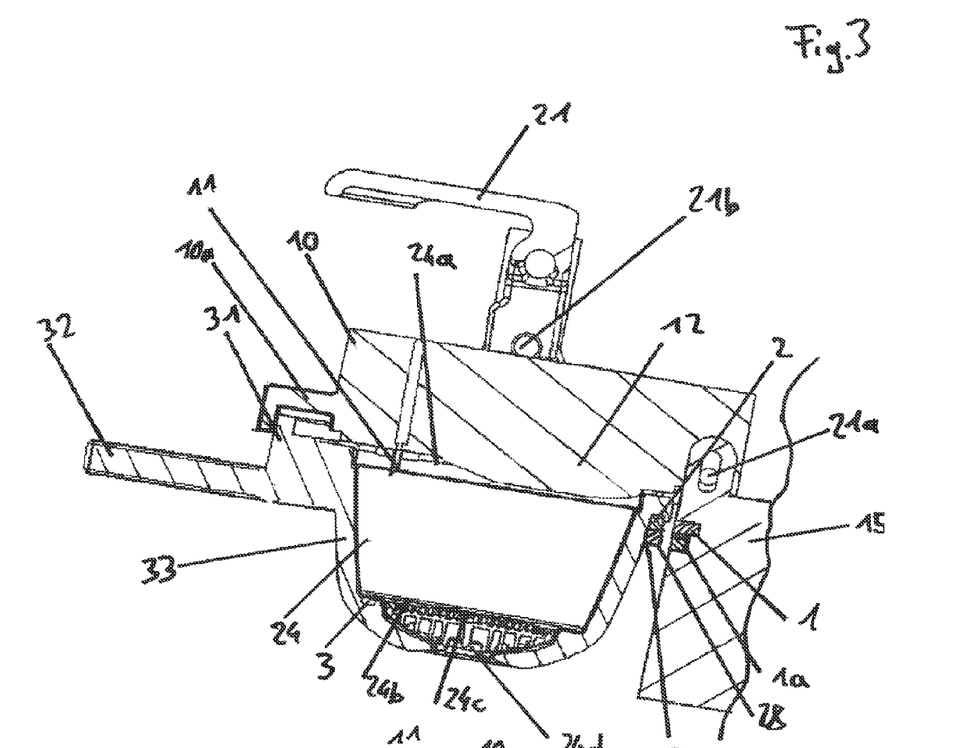
FIG. 3 shows a sectional side view of a capsule-holder connected to the device for beverage preparation when the closing mechanism of the device is in a closed state and the needle element pierces the capsule.

FIG. 3 shows a cross sectional side view of a capsule-holder 30 situated at the inside of the extraction head 20. Thereby, the closing mechanism 21 is in a closed state in which the injection member 10 is in its lower position. Hence, the needle element 11 provided at the injection member 10 is enabled to pierce the capsule 24 which is housed by the housing means 33 of the capsule-holder 30.

In order to enable a relative movement of the injection member 10 and the capsule-holder 30, the closing mechanism 21 connected to the injection member 10 comprises pivoting means 21a and a lever mechanism 21b. The lever mechanism 21b is preferably a knee lever mechanism. Of course, any other closing or transmission mechanism may be connected to the injection member 10 in order to enable a relative movement of the injection member 10 and the capsule 24 to be pierced.

In an embodiment, at least one protruding tooth 10a is provided at the injection member 10 to interact with the capsule-holder 30 and prevent an insertion or withdrawal of the capsule-holder 30 when the closing mechanism 21 is in a closed state. Accordingly, the needle element 11 of the injection member 10 can effectively be prevented from being damaged.

When the capsule-holder 30 is connected to the inside of the extraction head 20, encoding means 2 provided at the capsule-holder 30 are situated preferably in vicinity of the decoding means 1 provided at the device 50. Thus, a transmission of information between the encoding means 2 connected to the capsule-holder 30 and the decoding means 1 connected to the device 50 is enabled. Preferably, the encoding means 2 are situated at a front face 30a of the capsule-holder 30. The decoding means 1 are preferably provided at the rear wall 15 of the capsule-holder receiving chamber 25 of the device 50, as shown in the figure.

The injection member 10 is provided with a protruding convex part 12 which is situated at the same face of the injection member 10 as the needle element 11. Thus, the convex part 12 of the injection member 10 protrudes into the capsule-holder receiving chamber 25 of the device 10. Preferably, the convex part 12 is located close to the rear wall 15 of the capsule-holder receiving chamber 25 in order to engage the upper face 24a of the capsule 24 and reduce the internal volume of the capsule as described in co-pending European patent application No. 07103613.1 filed on 6 Mar. 2007.

As the pump 70 of the device 50 provides liquid to the needle element 11 and thus to the capsule 24 beneath the injection member 10, the liquid is made to interact with the ingredients provided within the capsule 24. In addition, pressure is built up within the capsule 24 due to the liquid introduced by the needle element 11. Accordingly, an outlet membrane 24b is pressed against reliefs 24c provided beneath the outlet membrane 24b. Hence, the outlet membrane 24b is opened and the beverage is poured from the capsule 24 downwardly via an outlet 24d. Thus, a direct flow principle of the liquid provided by the device 50 is adapted.

The capsule-holder 30 further comprises a water reflector which is preferably provided at the inside of the housing means 33 for receiving the capsule 24. The water reflector 3 is preferably a circular recess at the lower part of the housing means 33.

As shown in FIG. 3, the water reflector 3 is situated at the capsule-holder 30 such that a capsule 24 can still be provided to the housing means 33 of the capsule-holder 30. Thus, the water reflector 3 does not affect the correct positioning of the capsule 24 within the housing means 33 of the capsule-holder 30.

Figure 4:
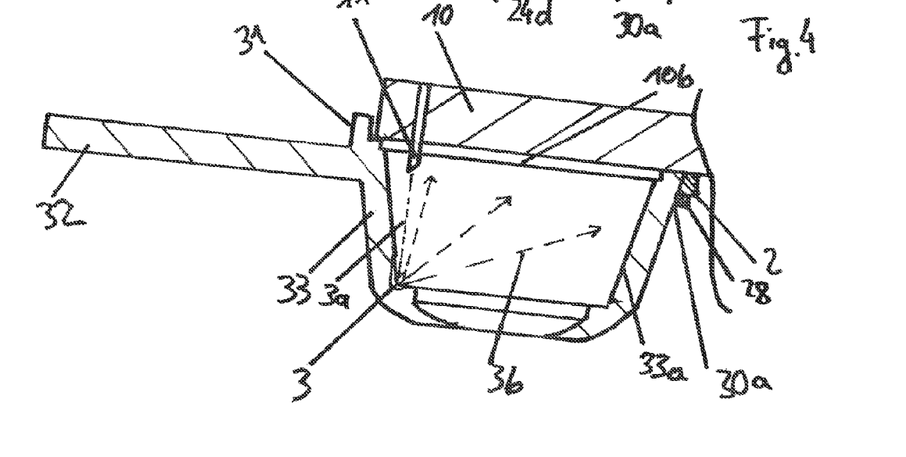
FIG. 4 shows a sectional side view of a preferred embodiment of the capsule-holder having a deflector for deflecting a jet of liquid.

As shown in FIG. 4, the water reflector 3 is preferably provided at such a position at the housing means 33 that a water jet 3a provided by the needle element 11 can be effectively reflected. Preferably, the water reflector 3 is designed in such a way that the water jet 3a is reflected into a water spray or fan 3b which reaches the lower surface 10b of the injection member 10, as well as the inside 33a of the housing means 33 for the capsule 24 of the capsule-holder 30. Thus, especially when hot water is supplied by means of the needle element 11, effective cleaning of the lower surface of the injection element 10 and the inside 33a of the housing means 33 can be attained.

Figure 5:
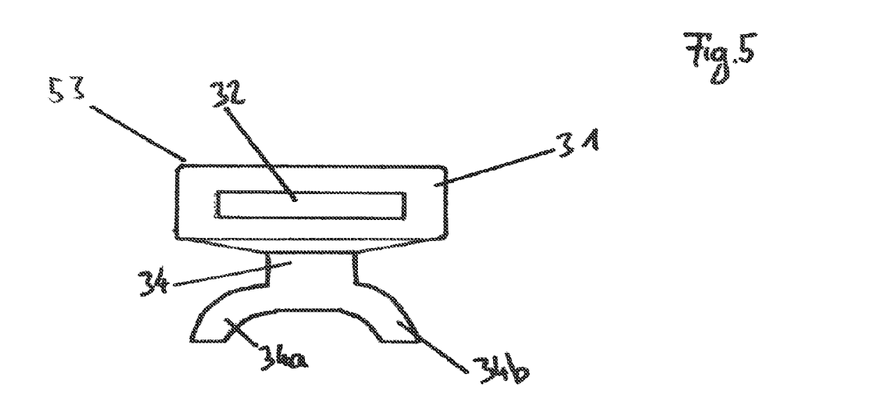
FIG. 5 shows a front view of another embodiment of the capsule-holder having two outlets for redirecting the liquid jet provided by the device.

FIG. 5 shows another embodiment of a holder 53 which can be inserted into the aperture 22 of the extraction head 20 of the device 50. The holder comprises handling means 32 such as a handle bar and a front cover 31 which covers the aperture 22 of the device 50 when the holder 53 is inserted into the aperture 22.

Moreover, the holder 53 comprises means 34 for separating the liquid provided by the device 50. Thus, the liquid can be effectively provided to two separate outlets 34a, 34b connected to the separating means 34. Accordingly, a user of the device 50 can place two receptacles beneath the holder 53 connected to the machine and hence obtain two beverages provided by the machine in a convenient way. The holder 53 may as well comprise means such as a sieve for receiving conventional tea leaves or the like in order to prepare tea with the device 50.

Figure 6:
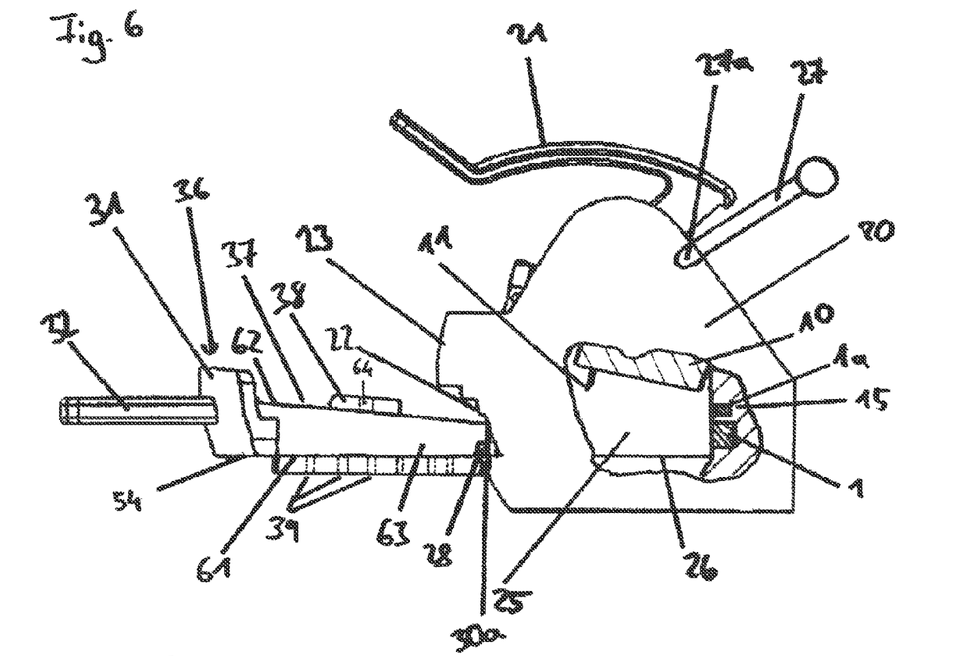
FIG. 6 shows an extraction head of the machine in side view having an aperture for introducing an insert forming a water shower.
Figure 7:
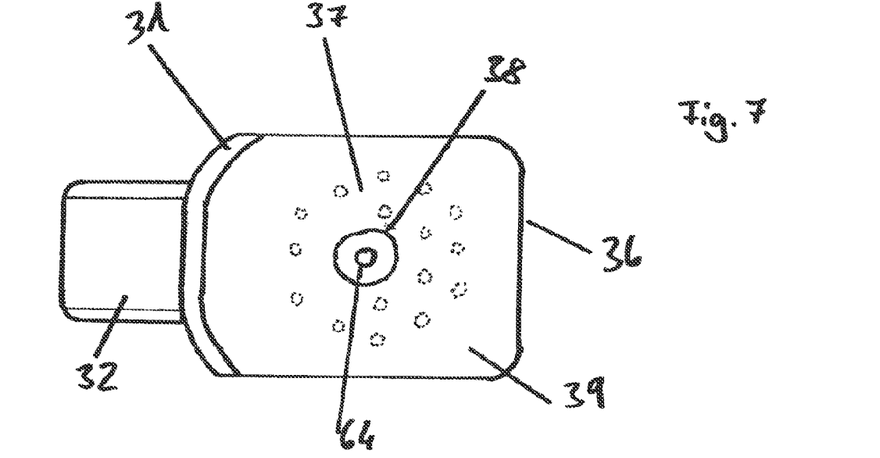
FIG. 7 shows a top view of the insert of FIG. 6.

In FIGS. 6 and 7, a water injection insert 36 replaces the capsule-holder. The insert comprises a base 54 comprising guiding side means 63 with lower and upper edges 61, 62. The base further comprises a water injection interface 37 designed to alter the conditions of injection of the water injection member 11 of the device. For example, the water injection interface 37 comprises a water connector 38 with sealing means such as a rubber pad comprising a central aperture 64 for receiving the needle of the injection member 11. At the bottom of the insert several injection outlets 39 are provided to spread water into a plurality of pressure reduced water jets. Like in the preceding modes, the insert 36 comprises a front face 30a in which a magnet or ferro-magnetic element 28 is embedded which is intended to be magnetically attracted by a magnet 1a or iron core positioned at the rear wall 15 of the receiving chamber 25.

Figure 8:
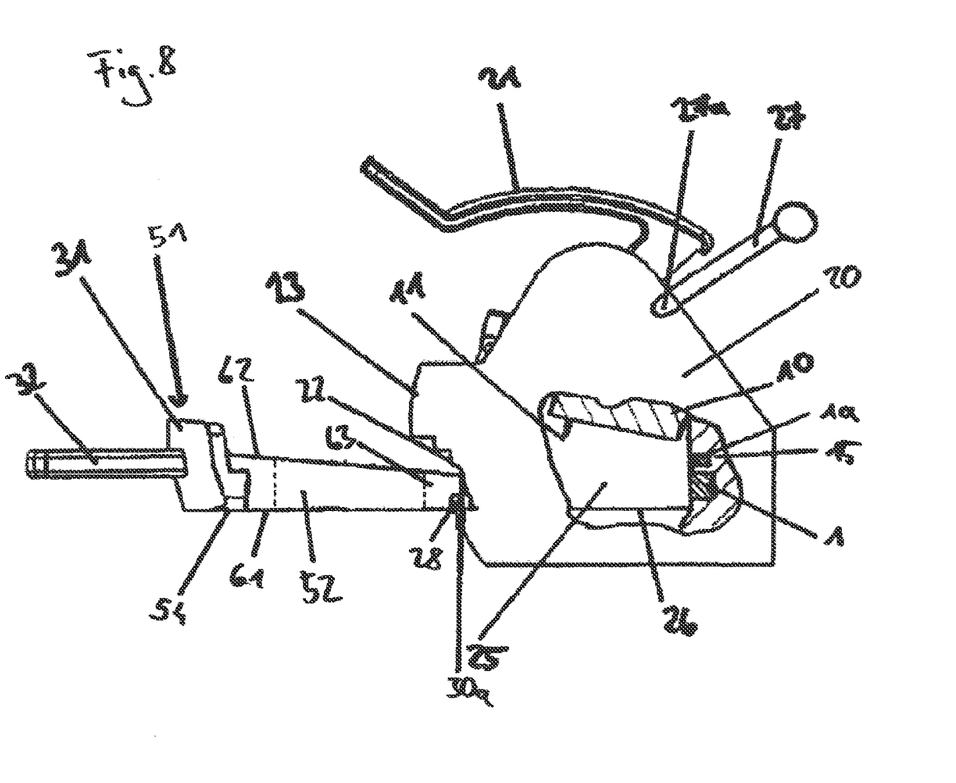
FIG. 8 shows an extraction head of the machine in a lateral view having an aperture for introducing an insert according to another variant of the invention.
Figure 9:
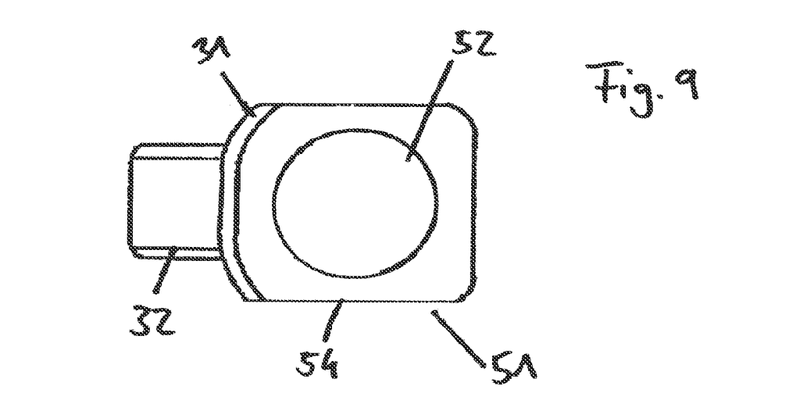
FIG. 9 shows a top view of the insert of FIG. 8.

In FIGS. 8 and 9, another insert for beverage frothing 51 is represented which comprises a handle 32 and a base 54 with side guiding means 63 complementary to the guiding means 26 of the receiving chamber and a through-passage 52 enabling the injection member to be disclosed when the insert is locked in place in the device. In this embodiment, the insert 51 only serves the purpose to establish the magnetic contact with the device when it is inserted in place in the device and thus enables the device to deliver water through the injection member 11 and directly to a receptacle placed beneath the receiving chamber 25. In this case, the water injection from the injection member 11 is not altered and a high pressure jet from the injection member 11 can be maintained to froth a beverage ingredient placed in the receptacle. For instance, the insert 51 may be placed in the device when liquid milk must be frothed with the water jet directed to the receptacle in order to prepare a cappuccino.

Although the present invention has been described with reference to preferred embodiments thereof, many modifications and alternations may be made by a person having ordinary skill in the art without departing from the scope of this invention which is defined by the appended claims. For example, other accessories may be connected to the device in order to make use of the liquid jet provided by the device. For example, the water jet may be used for frothing milk or making Latte Macchiato. These accessories may as well be equipped with encoding means in order to interact with the decoding means provided at the device.

The invention is claimed as follows:

1. A system for preparing a beverage from a food substance contained in a capsule by injection of a liquid into the capsule, the system comprising:
   a device comprising
      an extraction head having an aperture for receiving the capsule in a capsule-holder receiving chamber defined by chamber walls which include a rear wall,
      an injection member for supplying the liquid for injection into the capsule, and
      decoding means located on the rear wall; and
   a capsule holder comprising
      a housing for receiving the capsule,
      a front wall comprising encoding means configured to interact with the decoding means, and
      a handle located opposite to the front wall on the capsule holder,
   the chamber walls are configured such that the capsule holder may be enclosed within the capsule-holder receiving chamber.

2. The system of claim 1, wherein the encoding means comprises at least one magnet.

3. The system of claim 2, wherein the at least one magnet is positioned to interact with a magnetic material provided on the rear wall of the capsule-holder receiving chamber when the capsule holder is inserted into the capsule-holder receiving chamber.

4. The system of claim 1, wherein the encoding means comprises at least two magnets symmetrically arranged thereon.

5. The system of claim 4, wherein the at least two magnets interact equally with a magnetic material provided on the rear wall of the capsule-holder receiving chamber when the capsule holder is inserted into the capsule-holder receiving chamber to assure correct placement of the capsule holder in the capsule-holder receiving chamber.

6. The system of claim 1, wherein the encoding means and the decoding means interact by a method selected from the group consisting of optically, magnetically, by contact, and combinations thereof.

7. The system of claim 1, wherein the decoding means are designed to detect the presence of the capsule-holder.

\* \* \* \* \*